(12) United States Patent
Zhang et al.

(10) Patent No.: US 8,687,310 B1
(45) Date of Patent: Apr. 1, 2014

(54) ITERATIVE DECODING USING ADAPTIVE FEEDBACK

(71) Applicant: LSI Corporation, Milpitas, CA (US)

(72) Inventors: Fan Zhang, Milpitas, CA (US); Jun Xiao, Fremont, CA (US); Wu Chang, Sunnyvale, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/687,688

(22) Filed: Nov. 28, 2012

(51) Int. Cl.
*G11B 5/035* (2006.01)
(52) U.S. Cl.
USPC .................................. 360/65; 360/53; 360/39
(58) Field of Classification Search
None
See application file for complete search history.

(56) References Cited

U.S. PATENT DOCUMENTS

| | | | |
|---|---|---|---|
| 5,422,760 A | 6/1995 | Abbott et al. | |
| 6,928,125 B2 * | 8/2005 | Nakano et al. | 375/341 |
| 7,054,378 B2 | 5/2006 | Walton et al. | |
| 7,266,750 B1 | 9/2007 | Patapoutian et al. | |
| 7,394,608 B2 * | 7/2008 | Eleftheriou et al. | 360/65 |
| 7,864,467 B2 * | 1/2011 | Eleftheriou et al. | 360/46 |
| 8,122,332 B2 | 2/2012 | Song et al. | |

OTHER PUBLICATIONS

Nathan P. Chan, "Design and Prototyping of a Turbo Decoder Using the Berkeley Emulation Engine (BEE)," Research Project, Master of Science, Plan II, 2003, 76 pages.

* cited by examiner

*Primary Examiner* — Muhammad N Edun
(74) *Attorney, Agent, or Firm* — Ryan, Mason & Lewis, LLP

(57) ABSTRACT

An apparatus comprises read channel circuitry and signal processing circuitry associated with the read channel circuitry. The signal processing circuitry is configured to: equalize a digital data signal; align the equalized digital data signal; determine a detector reliability metric based at least in part on the aligned equalized digital data signal; perform an iterative decoding process to determine a decoded digital data signal using the detector reliability metric; adjust the aligned equalized digital data signal using the decoded digital data signal; and repeat at least determining the detector reliability metric and performing the iterative decoding process using the adjusted equalized digital data signal.

22 Claims, 5 Drawing Sheets

ITERATIVE DECODING USING ADAPTIVE FEEDBACK

FIELD OF THE INVENTION

The field of the invention relates to signal processing, and, more particularly, to processing of digital data signals.

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

SUMMARY

In one embodiment, an apparatus comprises read channel circuitry and signal processing circuitry associated with the read channel circuitry. The signal processing circuitry is configured to: equalize a digital data signal; align the equalized digital data signal; determine a detector reliability metric based, at least in part on the aligned equalized digital data signal; perform an iterative decoding process to determine a decoded digital data signal using the detector reliability metric; adjust the aligned equalized digital data signal using the decoded digital data signal; and repeat at least determining the detector reliability metric and performing the iterative decoding process using the adjusted equalized digital data signal.

Other embodiments of the invention include, by way of example and without limitation, methods, storage devices, virtual storage systems, integrated circuits and computer-readable storage media having computer program code embodied therein.

DETAILED DESCRIPTION

Embodiments of the invention will be illustrated herein in conjunction with exemplary disk-based storage devices, read channel circuitry and associated signal processing circuitry for processing read channel data signals. For example, embodiments of the invention include HDDs or other types of storage devices that exhibit enhanced signal processing by using feedback from one or more elements of a processing loop to improve processing and decoding of read channel data signals. It should be understood, however, that these and other embodiments of the invention are more generally applicable to any storage device in which improved signal processing is desired. Additional embodiments may be implemented using components other than those specifically shown and described in conjunction with the illustrative embodiments.

The following acronyms are utilized in this description:

| | |
|---|---|
| BPSK | Binary Phase-Shift Keying |
| DFIR | Digital Finite Impulse Response |
| HDD | Hard Disk Drive |
| LDPC | Low-Density Parity-Check |
| LLR | Log Likelihood Reliability |
| MAP | Maximum a Posteriori Probability |
| NPFIR | Noise Predictive Finite Impulse Response |
| NRZ | Non Return to Zero |
| RAID | Redundant Array of Independent Storage Devices |
| RPM | Revolutions Per Minute |
| RS | Reed Solomon |
| SOVA | Soft-output Viterbi Algorithm |

Figure 1:
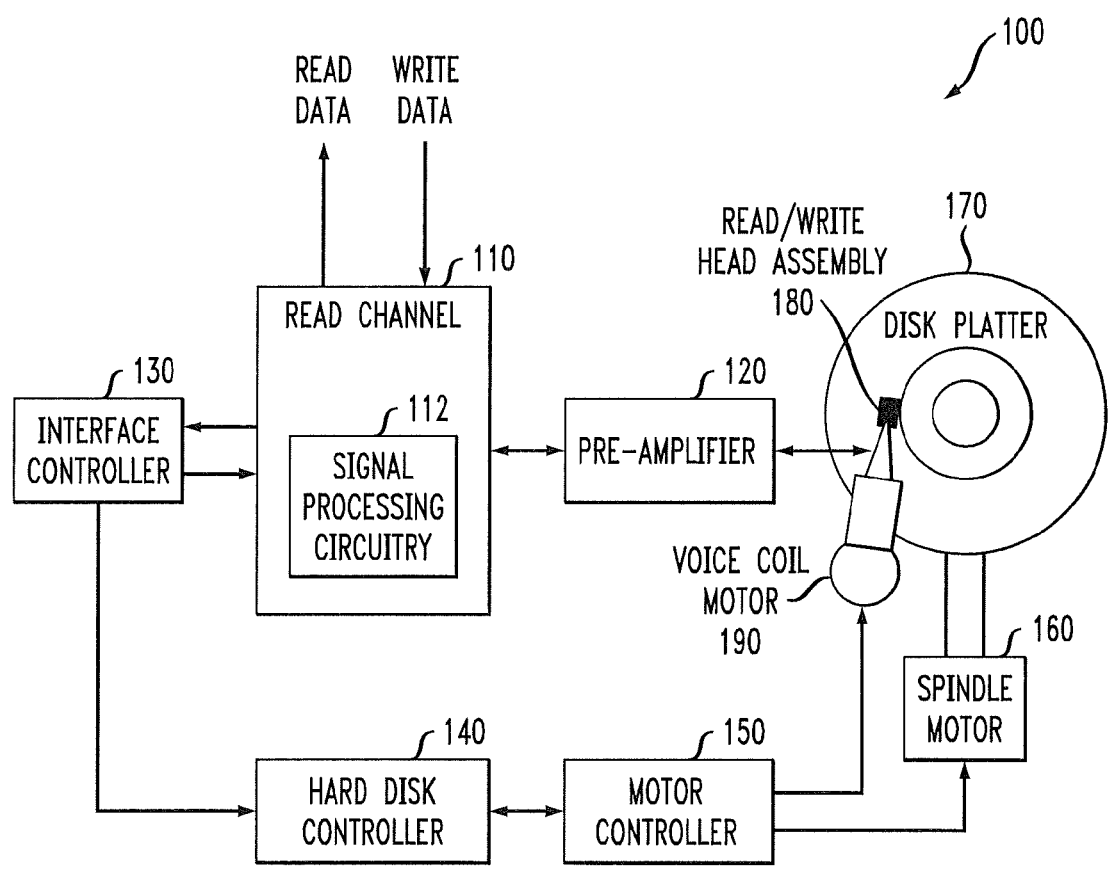
FIG. 1 shows a disk-based storage device, according to an embodiment of the invention.

FIG. 1 shows a disk-based storage device 100 including read channel circuitry 110 having a signal processing circuitry 112 in accordance with various embodiments of the invention. Although shown in FIG. 1 as being incorporated within read channel circuitry 110, the signal processing circuitry 112 may also be implemented at least in part externally to the read channel circuitry 110. Storage device 100 may be, for example, a hard disk drive. Storage device 100 also includes a preamplifier 120, an interface controller 130, a hard disk controller 140, a motor controller 150, a spindle motor 160, a disk platter 170, read/write head assembly 180, and voice coil motor 190. Interface controller 130 controls addressing and time of data to and from disk platter 170. In some embodiments, disk platter 170 includes magnetic signals recorded in accordance with either a longitudinal or a perpendicular recording scheme.

Read/write head assembly 180 is positioned by voice coil motor 190 over a desired data track on disk platter 170. Motor controller 150 controls the voice coil motor 190. Motor controller 150 controls the voice coil motor 190 to position read/write head assembly 180 in relation to disk platter 170 and drives spindle motor 160 by moving read/write head assembly to the proper data track on disk platter 170 under direction of hard disk controller 140. Spindle motor 160 spins disk platter 170 at a determined spin rate in revolutions per minute (RPM).

Once read/write head assembly 180 is positioned adjacent the proper data track, magnetic signals representing data on disk platter 170 are sensed by read/write head assembly 180 as disk platter 170 is rotated by spindle motor 160. The sensed magnetic signals are provided as an analog signal representative of the magnetic data on disk platter 170. This analog signal is transferred from read/write head assembly 180 to read channel circuitry 110 via preamplifier 120. Preamplifier 120 is operable to amplify the analog signals accessed from disk platter 170. In turn, read channel circuitry 110 decodes and digitizes the received analog signal to recreate the information originally written to disk platter 170. This data is provided as read data.

Various elements of the storage device 100 may be implemented at least in part within a processing device. A processing device includes a processor and a memory, and may be implemented at least in part within an associated host computer or server in which the storage device 100 is installed. Portions of the processing device may be viewed as comprising "control circuitry" as that term is broadly defined herein.

It is important to note that storage device 100 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

In order to improve the data readout performance of storage device 100, the read channel circuitry 110 incorporates a processing loop through signal processing circuitry 112.

Figure 2:
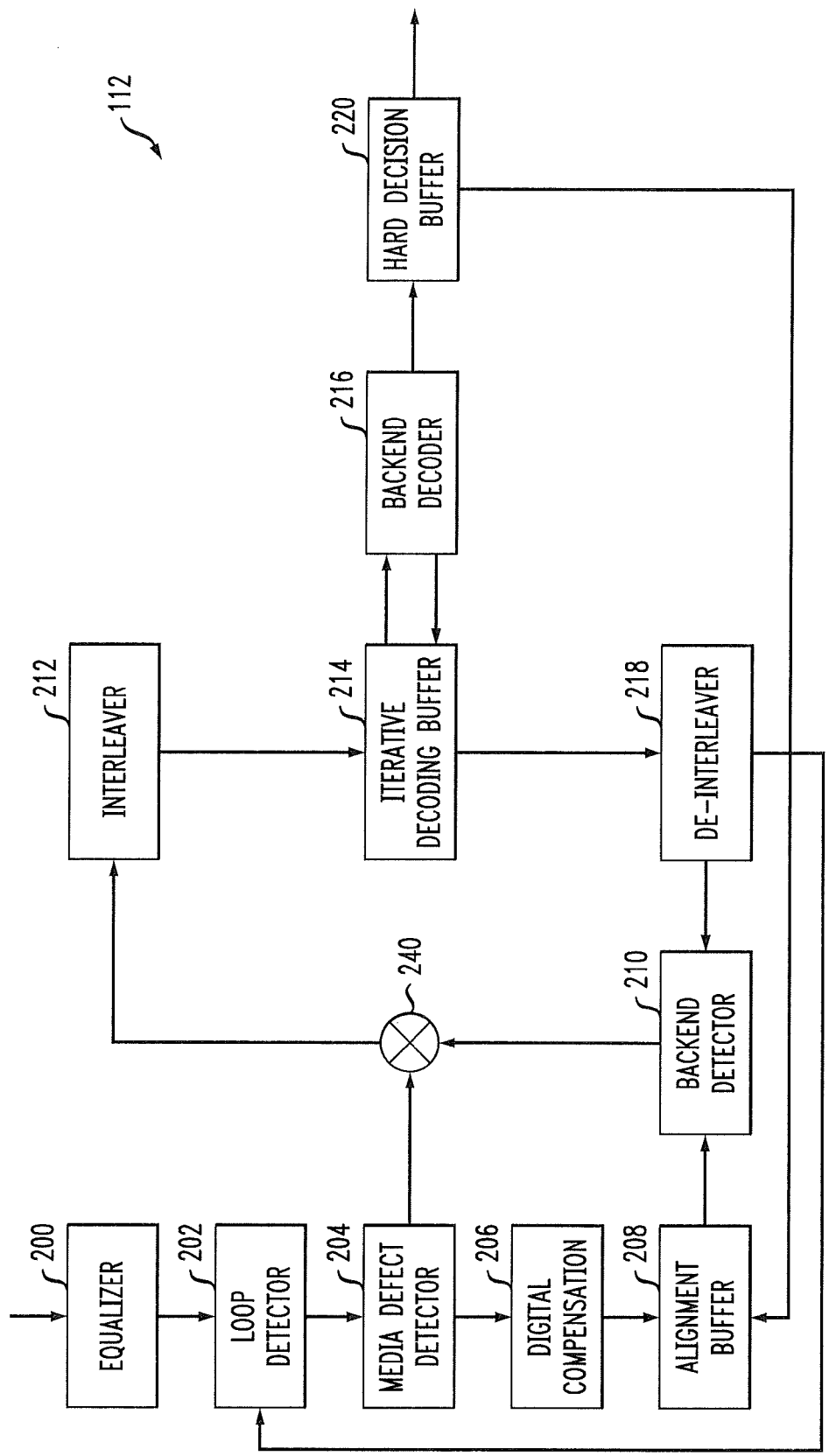
FIG. 2 is a detailed view of portions of the signal processing circuitry of FIG. 1, according to an embodiment of the invention.

Referring now to FIG. 2, an example of signal processing circuitry 112 according to one embodiment is shown. An equalizer 200 is configured to receive a digital data signal. The digital data signal may be received from an analog-to-digital converter, which converts an analog read channel signal to a digital data signal. The equalizer 200 performs equalization on the digital data signal to determine an equalized digital data signal. In some embodiments, the equalizer 200 comprises one or more digital finite impulse response (DFIR) filters and other circuitry used to equalize a digital signal comprising a number of samples received from the analog-to-digital converter. The equalizer calculates a number of equalized samples y according to the equation $$y(k) = \sum_{i=-j_1}^{j_2} a_i x(k-i) + n(k) \qquad (1)$$

where $a_i$ correspond to equalizer coefficients, x represents non return to zero (NRZ) data, k is media data, and n is a noise term. The number of coefficients $a_i$ is determined by the DFIR filter used in the equalizer 200. For example, a 16-tap DFIR filter may use $j_1=6$ and $j_2=9$. Other 16-tap filters may use different values for $j_1$ and $j_2$. The y-samples output from the equalizer are an example of what is more generally referred to herein as an equalized digital data signal.

The equalizer 200 has an output coupled to an input of a loop detector 202. The loop detector 202 receives the equalized digital data signal and uses the equalized digital data signal to determine a loop detector reliability metric. The loop detector 202 may be a maximum a posteriori probability (MAP) detector, a soft-output Viterbi algorithm (SOVA) detector, or a combination of MAP, SOVA and other detector types. The loop detector may comprise a set of noise predictive finite impulse response (NPFIR) filters and other circuitry used to determine the loop detector reliability metric.

In addition to determining the loop detector reliability metric, the loop detector may be further configured to determine hard decision information and soft decision information using the equalized digital data signal. As discussed above, the equalized digital data signal may comprise a set of equalized samples, or y samples. The hard decision information comprises a hard decision for each of the y samples, while the soft decision information comprises reliability indicators for each of the hard decisions.

An output of the loop detector 202 is coupled to an input of a media defect detector 204. The media defect detector 204 is configured to determine if an analog signal received from the read/write head assembly 180 and preamplifier 120 has experienced an error such as a media defect in the storage disk, a thermal asperity condition, or a false sync/miss detection. Upon determining that such a condition exists, the media defect detector 204 is configured to send a media defect flag signal to digital compensation circuitry 206 and/or multiplier 240, as will be discussed in further detail below. The media defect detector 204 determines whether such a condition exists based at least in part on the loop detector reliability metric.

The media defect detector 204 has an output coupled to an input of the digital compensation circuitry 206. The digital compensation circuitry 206 is configured to perform compensation of the digital data signal to compensate for variations in the analog signal. An output of the digital compensation circuitry 206 is coupled to an input of an alignment buffer 208. The alignment buffer 208 is configured to align the equalized digital data signal to determine an aligned equalized digital data signal. The alignment buffer 208 is also configured to store the aligned equalized digital data signal.

The backend detector 210 has an input coupled to an output of the alignment buffer 208. The backend detector 210 may comprise a set of NPFIR filters and other circuitry used to determine a backend detector reliability metric based at least in part on the aligned equalized digital data signal. Similar to the loop detector 202, the backend detector 210 may a MAP detector, a SOVA detector, or a combination of MAP, SOVA and other detector types.

In addition to determining the backend detector reliability metric, the backend detector is further configured to determine hard decision information and soft decision information of the aligned equalized digital data signal. The aligned equalized digital data signal may comprise a set of aligned y samples. The hard decision information comprises a hard decision for each of the aligned y samples, while the soft decision information comprises reliability indicators for each of the hard decisions.

An output of the backend detector 210 is coupled to an input of the multiplier 240. The multiplier 240 is configured to adjust the backend detector reliability metric based at least in part on the media defect flag. The multiplier 240 can apply respective weightings to the media defect flag signal received from the media defect detector 204 and the backend detector reliability metric from the backend detector 210. It is important to note that in other embodiments, the multiplier 240 may be replaced with an adder or other signal combiner.

An interleaver 212 has an input coupled to an output of the multiplier 240. The interleaver 212 may be used to overcome correlated channel noise such as burst errors. An output of the interleaver 212 is coupled to an input of an iterative decoding buffer 214. The iterative decoding buffer 214 has an output coupled to an input of the backend decoder 216 and an input coupled to an output of the backend decoder 216. The iterative decoding buffer 214 is configured to store various information used in a local iterative decoding process performed by the backend decoder 216. Such information may include hard decision information, soft decision information, backend detector reliability metric(s), and decoder reliability metric(s). The backend decoder 216 is configured to determine the decoder reliability metric. In some embodiments, the decoder reliability metric comprises extrinsic log likelihood reliability (LLR) information for a current iteration of the local iterative decoding process. The backend decoder reliability metric may be determined according to the following equation:

$$Le(dec) = \text{LLR\_total}(dec) - La(dec) \qquad (2)$$

where La(dec) is a priori LLR information from the backend detector processing in the current iteration of the processing loop, LLR_total(dec) is LLR information calculated by the backend decoder in the current iteration of the local iterative decoding process and Le(dec) is the decoder reliability metric.

The backend decoder 216 will perform a number of iterations of the local iterative decoding process to determine a decoded digital data signal based at least in part on the backend detector reliability and the decoder reliability metric. The backend decoder 216 may also use hard decision information and/or soft decision information determined by the backend detector 210 to determine the decoded digital data signal. The decoded digital data signal is stored in a hard decision buffer 220, which has an input coupled to an output of the backend decoder 216. The decoder may be a low-density parity-check (LDPC) decoder, Reed Solomon (RS) decoder, or a combination of LDPC, RS and other decoder types.

In order to improve decoding of digital data signals, embodiments of the invention perform a number of iterations between elements shown in FIG. 2, referred to herein as global iterations. The backend detector 210 can be included in the global iterations, and the backend detector reliability metric may be updated in each global iteration to improve decoding of the digital data signal. The global iterations may comprise a turbo decoding process. In some embodiments, the backend detector reliability metric comprises extrinsic LLR information for a current global iteration of the processing loop. The backend detector reliability metric may be determined according to the following equation:

$$Le(det_{backend}) = \text{LLR\_total}(det_{backend}) - La(det_{backend}) \qquad (3)$$

where La($det_{backend}$) is a priori LLR information from a previous global iteration of the processing loop, LLR_total ($det_{backend}$) is LLR information calculated by the backend detector 210 in the current global iteration of the processing loop and Le($det_{backend}$) is the backend detector reliability metric. LLR_total($det_{backend}$) may be calculated based at least in part on an output of the de-interleaver 218.

Embodiments of the invention further improve decoding of digital data signals by adding more elements shown in FIG. 2 into the global iterations. For example, the decoded digital data signal stored in the hard decision buffer 220 may be used to adjust the aligned equalized digital data signal. The hard decision buffer 220 has an output coupled to an input of the alignment buffer 208. The alignment buffer 208 uses the decoded digital data signal to adjust the aligned equalized digital data signal determined in a previous global iteration. The decoded digital data signals may comprise a set of hard decisions corresponding to respective ones of the y samples, or some set of data derived from the set of hard decisions. The alignment buffer 208 can adjust respective ones of the aligned y samples using corresponding ones of the set of hard decisions or other data derived from the decoded digital data signal.

Thus, the backend detector reliability metric determined by the backend detector 210 in a second global iteration will be based on the adjusted aligned equalized digital data signal rather than the aligned equalized digital data signal. In the example above, LLR_total($det_{backend}$) will be calculated using the adjusted aligned equalized digital data signal in a second global iteration. Further global iterations can similarly use the adjusted aligned equalized digital data signal. In some embodiments, the decoded digital data signal itself will be the adjusted aligned equalized digital data signal. In other embodiments, the alignment buffer 208 may combine the aligned equalized digital data signal with the decoded digital data signal to determine the adjusted aligned equalized digital data signal.

In some embodiments, the loop detector 202 can be brought into the global iterations. The loop detector can use feedback from the de-interleaver 218 to improve the loop detector reliability metric. In some embodiments, the loop detector reliability metric comprises extrinsic LLR information for a current global iteration of a processing loop. The loop detector reliability metric may be determined according to the following equation:

$$Le(det_{loop}) = \text{LLR\_total}(det_{loop}) - La(det_{loop}) \qquad (4)$$

wherein La($det_{loop}$) is a priori log likelihood reliability information from a previous global iteration of the processing loop, LLR_total($det_{loop}$) is LLR information calculated by the loop detector 202 in the current global iteration of the processing loop and Le($det_{loop}$) is the loop detector reliability metric. LLR_total($det_{loop}$) will be calculated using extrinsic LLR information received from the de-interleaver 218.

The loop detector 202 will normally finish one sector of data of the read channel data signal per unit time. In order to ensure proper throughput at the loop detector 202, some embodiments add another detector or speed up processing at the loop detector 202. Throughput at the alignment buffer 208 is typically slow, so adjustments to the alignment buffer 208 are not required to incorporate the alignment buffer 208 into the global iterations.

Figure 3:
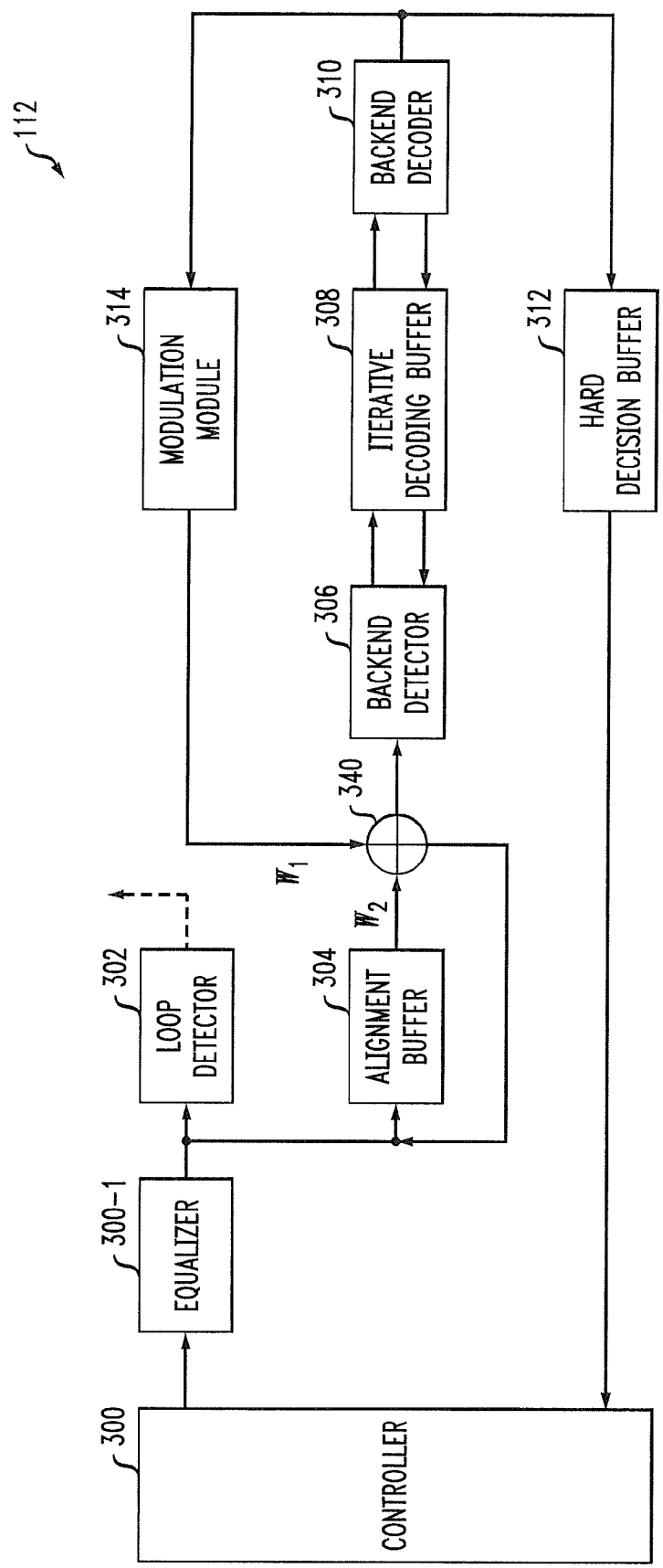
FIG. 3 is a detailed view of portions of the signal processing circuitry of FIG. 1, according to an alternate embodiment of the invention.

FIG. 3 shows an alternate embodiment of the signal processing circuitry 112 of FIG. 1. In FIG. 3, a controller 300 has an output coupled to an input of equalizer 300-1. The equalizer 300-1 is similar to the equalizer 200 as described above. The equalizer 300-1 is configured to receive a digital data signal from the controller 300, and to perform equalization on the digital data signal to determine an equalized digital data signal. The controller 300 may include an analog-to-digital converter, which converts an analog read channel signal into a digital data signal. The controller 300 may alternatively be in a serial path between an analog-to-digital converter and the equalizer 300-1. The controller 300 may also provide an interface between the signal processing circuitry 112 and the read channel circuitry 110. As discussed above, the digital data signal may comprise a number of samples and the equalized digital data signal comprises a number of corresponding equalized samples y. A loop detector 302 has an input coupled to an output of the equalizer 300-1. The loop detector 302 is similar to the loop detector 202 described above. The loop detector 202 is configured with an output, represented by the dashed line in FIG. 3, which is coupled to various other circuitry such as that shown in FIG. 2 (i.e., a media defect detector).

An alignment buffer 304 has an input coupled to an output of the equalizer 300-1. The alignment buffer 304 is configured to receive the equalized digital data signal and to align the equalized digital data signal. The alignment buffer 304 may align respective ones of the y samples to determine a set of aligned y samples. A signal combiner 340 has an input coupled to an output of the alignment buffer 304. A backend detector 306 has an input coupled to an output of the signal combiner 340. The backend detector 306 is similar to the backend detector 210 as described above. The backend detector 306 is configured to determine hard decision information, soft decision information and a backend detector reliability metric. An iterative decoding buffer 308 has an input coupled to an output of the backend detector 306, an output coupled to an input of the backend detector 306, an output coupled to an input of a backend decoder 310 and an input coupled to an output of the backend decoder 310. The iterative decoding buffer 308 is similar to the iterative decoding buffer 214 as described above. The iterative decoding buffer 308 stores hard decision information, soft decision information, and/or backend detector reliability metrics received from the backend detector 306. The iterative decoding buffer 308 is also configured to store decoder reliability metrics and other information received from the backend decoder 310. The backend decoder 310 is similar to the backend decoder 216 as described above.

The FIG. 3 embodiment differs from the FIG. 2 embodiment in how the feedback is used to incorporate more elements of the processing loop in global iterations of the decoding process. Similar to the FIG. 2 embodiment described above, the backend decoder 310 may perform a number of local iterations of an iterative decoding process to determine a decoded digital data signal. The decoded digital data signal determined by the backend decoder 310 may be a set of hard decisions or non return to zero (NRZ) data determined by the backend decoder 310. The FIG. 3 embodiment, similar to the FIG. 2 embodiment, incorporates alignment buffer 304 and the backend detector 306 to perform a number of global iterations on the y samples. Unlike the FIG. 2 embodiment, the FIG. 3 embodiment does not use the decoded digital data signal stored in hard decision buffer 312 to adjust the aligned y samples in an alignment buffer. Instead, the FIG. 3 embodiment has a modulation module 314 with an input coupled to an output of the backend decoder 310.

The modulation module 314 is configured to convert respective ones of the NRZ data or hard decisions in the decoded digital data signal into bipolar signals using binary phase-shift keying (BPSK) modulation. The bipolar signals are convolved with respective channel targets to obtain estimated y samples. The modulation module 314 has an output coupled to an input of the signal combiner 340. The signal combiner 340 applies respective weighting factors $W_1$ and $W_2$ to the estimated y samples received from the modulation module 314 and the aligned y samples received from the alignment buffer 304. The weighting factors $W_1$ and $W_2$ may be predetermined or adjustable. For example, the weighting factor $W_1$ may be low for a first global iteration, and may increase relative to weighting factor $W_2$ in subsequent global iterations. The estimated samples in an initial global iteration may not be very accurate compared to the aligned y samples received from the alignment buffer 304, while estimated samples in subsequent iterations gradually become more and more accurate compared to the aligned y samples received from the alignment buffer 304. The backend detector 306 will determine hard decision information, soft decision information, and backend detector reliability metrics on the combined signal received from the signal combiner 340.

The FIG. 3 embodiment further improves decoding of digital signals by incorporating the alignment buffer 304 in the iterative decoding process. As shown in FIG. 3, the signal combiner 340 has an output coupled to an input of the alignment buffer 304. Thus, the alignment buffer 304 can adjust the aligned y samples in subsequent global iterations. In the FIG. 3 embodiment, respective ones of the samples in the combined signal received from the signal combiner 340 are used to adjust corresponding ones of the aligned y samples. In other embodiments, the alignment buffer 304 may simply use the samples in the combined signal in place of the aligned y samples. In still other embodiments, the alignment buffer 304 may combine corresponding ones of the aligned y samples and samples in the combined signal received from the signal combiner 340 to determine adjusted aligned y samples. Thus, in subsequent global iterations, the signal combiner 340 will receive adjusted aligned-y samples from the alignment buffer 304 rather than aligned y samples from the alignment buffer 304.

It is important to note that in some embodiments, various elements shown in FIGS. 2 and 3 are not required. For example, the signal combiner 340 shown in FIG. 3 is not required. Instead, the alignment buffer 304 may receive the estimated samples from the modulation module 314. In still other embodiments, the modulation module 314 may have a first input coupled to an output of the signal combiner 340 and a second output coupled to an input of the alignment buffer 304. Each of the signal combiner 340 and the alignment buffer 304 may thus receive the estimated samples from the modulation module 314, instead of the signal combiner receiving the estimated samples from the modulation module 314 and the alignment buffer 304 receiving the combined signal from the signal combiner 340 as shown in FIG. 3. Various other arrangements may be used to incorporate feedback from the backend decoder 310 into other elements in the processing loop such as the loop detector 302, alignment buffer 304, backend detector 306, etc.

Figure 4:
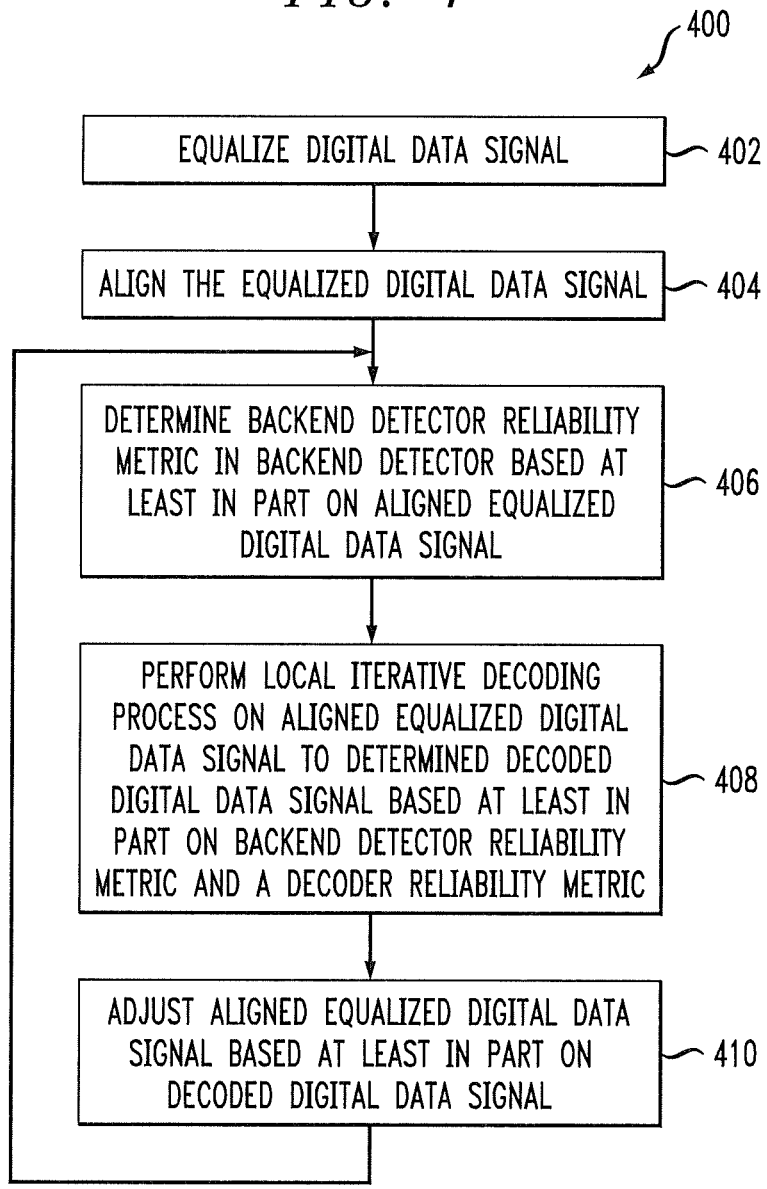
FIG. 4 illustrates a method of processing read channel data signals, according to an embodiment of the invention.

FIG. 4 illustrates a methodology 400 of signal processing. The method begins with equalizing a digital data signal in step 402. Step 402 may be performed in an equalizer such as the equalizer 200 in FIG. 2 or the equalizer 300-1 in FIG. 3. In step 404, the equalized digital data signal is aligned. Step 404 may be performed in an alignment buffer such as the alignment buffer 208 in FIG. 2 or alignment buffer 304 in FIG. 3. In step 406, a backend detector reliability metric is determined in a backend detector, such as backend detector 210 in FIG. 2 or backend detector 306 in FIG. 3, based at least in part on the aligned equalized digital data signal. In step 408, a local iterative decoding process is performed in a decoder, such as backend decoder 216 in FIG. 2 or backend decoder 310 in FIG. 3, to determine a decoded digital data signal using the backend detector reliability metric and a decoder reliability metric. In step 410, the aligned equalized digital data signal is adjusted using the decoded digital data signal. Steps 406 and 408 are then repeated using the adjusted, equalized digital data signal.

As mentioned previously, the storage device configuration can be varied in other embodiments of the invention. For example, the storage device may comprise a hybrid HDD which includes a flash memory in addition to one or more storage disks.

In addition, storage device 100 may be coupled to or incorporated within a host processing device, which may be a computer, server, communication device, etc.

Figure 5:
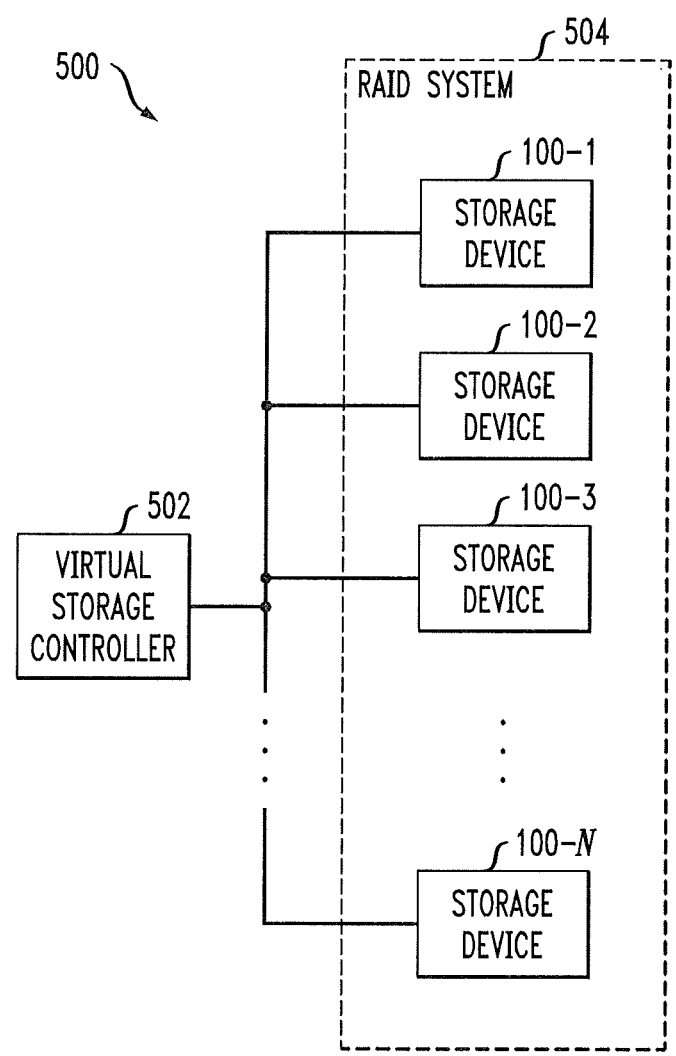
FIG. 5 shows a virtual storage system incorporating a plurality of disk-based storage devices of the type shown in FIG. 1, according to an embodiment of the invention.

Multiple storage devices 100-1 through 100-N possibly of various different types may be incorporated into a virtual storage system 500 as illustrated in FIG. 5. The virtual storage system 500, also referred to as a storage virtualization system, illustratively comprises a virtual storage controller 502 coupled to a RAID system 504, where RAID denotes Redundant Array of Independent storage Devices. The RAID system more specifically comprises N distinct storage devices denoted 100-1, 100-2, . . . 100-N, one or more of which may be HDDs and one or more of which may be solid state drives. Furthermore, one or more of the HDDs of the RAID system are assumed to be configured to include read channel circuitry and associated signal processing circuitry as disclosed herein. These and other virtual storage systems comprising HDDs or other storage devices are considered embodiments of the invention.

It should again be emphasized that the above-described embodiments of the invention are intended to be illustrative only. For example, other embodiments can use different types and arrangements of storage disks, read/write heads, read channel circuitry, signal processing circuitry, decoders, filters, detectors, and other storage device elements for implementing the described signal processing functionality. Also, the particular manner in which certain steps are performed in the signal processing may vary. These and numerous other alternative embodiments within the scope of the following claims will be apparent to those skilled in the art.

What is claimed is:

1. An apparatus, comprising:
read channel circuitry; and
signal processing circuitry associated with the read channel circuitry, the signal processing circuitry being configured to:
equalize a digital data signal;
align the equalized digital data signal;
determine a detector reliability metric based at least in part on the aligned equalized digital data signal;
perform an iterative decoding process to determine a decoded digital data signal using the detector reliability metric;
adjust the aligned equalized digital data signal using the decoded digital data signal; and
repeat at least determining the detector reliability metric and performing the iterative decoding process using the adjusted equalized digital data signal.

2. The apparatus of claim 1, wherein the equalized digital data signal comprises a set of samples and wherein the decoded signal comprises a set of corresponding hard decisions.

3. The apparatus of claim 2, wherein the signal processing circuitry is configured to adjust the aligned equalized digital data signal by adjusting respective ones of the set of aligned equalized digital data samples based at least in part on corresponding ones of the set of hard decisions.

4. The apparatus of claim 2, wherein each of the hard decisions comprises non return to zero data, and wherein the signal processing circuitry is further configured to:
convert respective ones of the non return to zero data into bipolar signals using binary phase-shift keying modulation;
convolve the bipolar signals with channel targets to obtain estimated samples; and
determine the adjusted aligned equalized digital data signal by applying respective weighting factors to the estimated samples and the aligned equalized digital data samples.

5. The apparatus of claim 1, wherein the signal processing circuitry is configured to perform a number of global iterations of a processing loop, each of the global iterations comprising at least determining the detector reliability metric, performing the iterative decoding process and adjusting the aligned equalized digital data signal.

6. The apparatus of claim 5, wherein the global iterations comprise a turbo decoding process.

7. The apparatus of claim 5, wherein performing the iterative decoding process comprises determining a decoder reliability metric, the decoder reliability metric comprising extrinsic log likelihood reliability information, for a current iteration of the iterative decoding process determined according to the following equation:

$$Le(dec) = \text{LLR\_total}(dec) - La(dec)$$

wherein $La(dec)$ is a priori log likelihood reliability information based at least in part on the detector reliability metric determined in a current global iteration of the processing loop, $\text{LLR\_total}(dec)$ is log likelihood reliability information calculated in the current iteration of the iterative decoding process and $Le(dec)$ is the decoder reliability metric.

8. The apparatus of claim 5, wherein the detector reliability metric comprises extrinsic log likelihood reliability information for a current global iteration of the processing loop determined according to the following equation:

$$Le(det_{backend}) = \text{LLR\_total}(det_{backend}) - La(det_{backend}),$$

wherein $La(det_{backend})$ is a priori log likelihood reliability information from a previous global iteration of the processing loop, $\text{LLR\_total}(det_{backend})$ is log likelihood reliability information calculated in the current global iteration of the processing loop and $Le(det_{backend})$ is the detector reliability metric.

9. The apparatus of claim 1, wherein the signal processing circuitry comprises:
an equalizer configured to equalize the digital data signal;
an alignment buffer with an input coupled to an output of the equalizer, the alignment buffer being configured to align the equalized digital data signal;
a detector with an input coupled to an output of the alignment buffer, the detector being configured to determine the detector reliability metric;
an iterative decoding buffer with an input coupled to an output of the detector, the iterative decoding buffer being configured to store the detector reliability metric; and
a decoder with an input coupled to an output of the iterative decoding buffer and an output coupled to an input of the alignment buffer, the decoder being configured to perform the iterative decoding process;
wherein at least the alignment buffer, detector and decoder form a processing loop configured to perform a number of global iterations for the equalized digital data signal, the adjusted aligned equalized digital data signal determined in a first global iteration of the processing loop being used by the alignment buffer, detector and decoder in at least a second global iteration of the processing loop.

10. The apparatus of claim 9, further comprising a loop detector with an input coupled to an output of the equalizer, the loop detector being configured to determine a loop detector reliability metric based at least in part on the equalized digital data signal.

11. The apparatus of claim 10, wherein the loop detector reliability metric comprises extrinsic log likelihood reliability information for a current global iteration of the processing loop determined according to the following equation:

$$Le(det_{loop}) = \text{LLR\_total}(det_{loop}) - La(det_{loop})$$

wherein $La(det_{loop})$ is a priori log likelihood reliability information from a previous global iteration of the processing loop, $\text{LLR\_total}(det_{loop})$ is log likelihood reliability information calculated in the current global iteration of the processing loop and $Le(det_{loop})$ is the loop detector reliability metric.

12. The apparatus of claim 10, further comprising:
a media defect detector with an input coupled to an output of the loop detector, the media defect detector being configured to generate a media defect flag; and
a multiplier with an input coupled to a output of the detector and an input coupled to an output of the media defect detector, the multiplier being configured to adjust the detector reliability metric based at least in part on the media defect flag;
wherein the media defect flag is determined based at least in part on the loop detector reliability metric.

13. The apparatus of claim 10, further comprising:
an interleaver with an input coupled to an output of the detector and an output coupled to an input of the iterative decoding buffer; and
a de-interleaver with an input coupled to an output of the iterative decoding buffer and an output coupled to an input of the detector, the de-interleaver being configured to determine a de-interleaver reliability metric;
wherein the de-interleaver reliability metric is used as a priori log likelihood reliability information in determining the loop detector reliability metric.

14. The apparatus of claim 9, further comprising:
an interleaver with an input coupled to an output of the detector and an output coupled to an input of the iterative decoding buffer; and
a de-interleaver with an input coupled to an output of the iterative decoding buffer and an output coupled to an input of the detector, the de-interleaver being configured to determine a de-interleaver reliability metric;
wherein the de-interleaver reliability metric is used as a priori log likelihood reliability information in determining the detector reliability metric.

15. The apparatus of claim 1, wherein the detector is a maximum a posteriori probability detector.

16. The apparatus of claim 1, further comprising a disk controller coupled to the read channel circuitry.

17. The apparatus of claim 1 wherein the read channel circuitry and associated signal processing circuitry are fabricated in at least one integrated circuit.

18. A storage device comprising the apparatus of claim 1.

19. A virtual storage system comprising the storage device of claim 18.

20. A method comprising the steps of:
equalizing a digital data signal;
aligning the equalized digital data signal;
determining a detector reliability metric based at least in part on the aligned equalized digital data signal;
performing an iterative decoding process to determine a decoded digital data signal using the detector reliability metric;
adjusting the aligned equalized digital data signal using the decoded digital data signal; and
repeating at least the determining and performing steps using the adjusted equalized digital data signal.

21. The method of claim 20, wherein the aligned equalized digital data signal comprises a set of aligned equalized digital data samples and the decoded digital data signal comprises a set of corresponding hard decisions comprising non return to zero data, and wherein the adjusting step further comprises:
modulating respective ones of the non return to zero data into bipolar signals using binary phase-shift keying modulation;
convolving the bipolar signals with channel targets to obtain estimated samples; and
determining the adjusted aligned equalized digital data signal by applying respective weighting factors to the estimated samples and the aligned equalized digital data samples.

22. A storage device comprising:
at least one storage medium;
a read head configured to read data from the storage medium; and
control circuitry coupled to the read head and configured to process data received from the read head;
the control circuitry comprising:
read channel circuitry; and
signal processing circuitry associated with the read channel circuitry, the signal processing circuitry being configured to:
equalize a digital data signal;
align the equalized digital data signal;
determine a detector reliability metric based at least in part on the aligned equalized digital data signal;
perform an iterative decoding process to determine a decoded digital data signal using the detector reliability metric;
adjust the aligned equalized digital data signal using the decoded digital data signal; and
repeat at least determining the detector reliability metric and performing the iterative decoding process using the adjusted equalized digital data signal.

* * * * *